United States Patent [19]

Smith

[11] Patent Number: 4,813,506

[45] Date of Patent: Mar. 21, 1989

[54] TRACKED VEHICLE STEERING MECHANISM

[75] Inventor: Roger R. Smith, Imlay City, Mich.

[73] Assignee: The United States of America as represented by the Secretary of the Army, Washington, D.C.

[21] Appl. No.: 75,800

[22] Filed: Jul. 13, 1987

[51] Int. Cl.⁴ ............................................. B62D 11/14
[52] U.S. Cl. .................................... 180/6.44; 180/6.2; 74/665 T
[58] Field of Search ......................... 180/6.44, 6.2, 149; 74/665 T, 664

[56] References Cited

U.S. PATENT DOCUMENTS

| | | | |
|---|---|---|---|
| 3,351,149 | 11/1967 | Lundin et al. | 180/6.44 |
| 3,395,671 | 8/1968 | Zimmerman | 180/6.44 |
| 3,450,218 | 6/1969 | Looker | 180/6.44 |
| 4,718,508 | 1/1988 | Terrola | 180/6.44 |

*Primary Examiner*—Charles A. Marmor
*Assistant Examiner*—Donn McGiehan
*Attorney, Agent, or Firm*—Peter A. Taucher; David L. Kuhn

[57] ABSTRACT

A steering mechanism for a tracked vehicle wherein a motor-operated gear is arranged to rotate two planetary gear components in opposite directions. A single input shaft drives two planetary gear systems at different speeds and/or different directions to achieve a vehicle steer action. The mechanism is compactly arranged so that the control gearing is centered on the input shaft axis.

10 Claims, 2 Drawing Sheets

TRACKED VEHICLE STEERING MECHANISM

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to steering mechanism for a tracked vehicle, e.g. a military tank. A particular aim is to provide a steering mechanism that is relatively efficient without being extremely complicated or expensive. The new steering mechanism may be considered as an improvement or refinement on the steering mechanism disclosed in U.S. Pat. No. 3,351,149 issued to L. Lundin et al on Nov. 7, 1967.

THE DRAWINGS

INVENTION CONCEPT IN BRIEF

My invention contemplates a steering mechanism that includes a single input shaft and two separate output shafts. The input shaft is connectable to a power source, e.g. an engine and variable ratio transmission of conventional design. One output shaft is connectable to a track-drive sprocket at one side of the vehicle. The other output shaft is connectable to a second track-drive sprocket at the other side of the vehicle.

The input shaft is connected to the output shafts via two separate planetary gear drive systems. One gear in each planetary drive system is normally held in a stationary condition by a reaction mechanism, such that normally both output shafts are driven in the same direction and at the same speed for moving the vehicle straight ahead (or straight back).

A reversible steering control motor is connected to the reaction mechanisms to rotate same in opposite directions, for thereby varying the drive actions of the planetary gear systems, thus turning (steering) the vehicle to the right or to the left, depending on the direction taken by the steering control motor.

Figure 1:
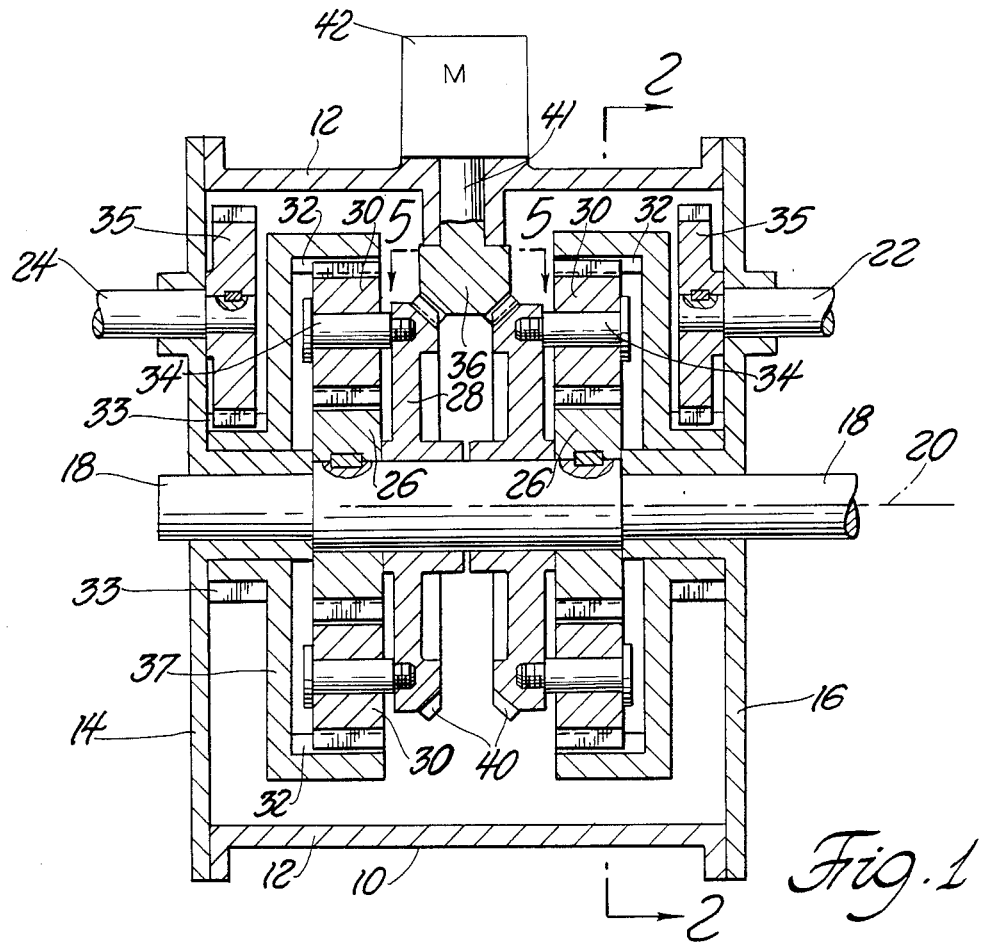
FIG. 1 is a sectional view taken through a steering mechanism embodying my invention.
Figure 3:
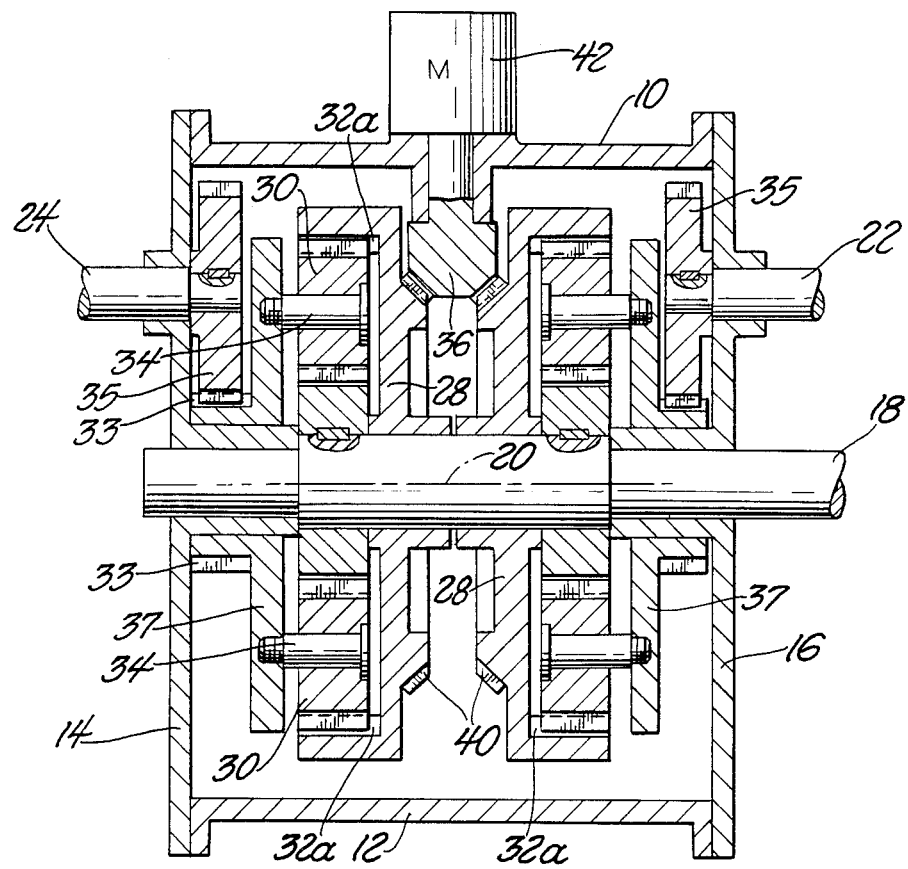
FIGS. 3 and 4 are sectional views taken in the same direction as FIG. 1, but illustrating other forms that my invention can take.
Figure 4:
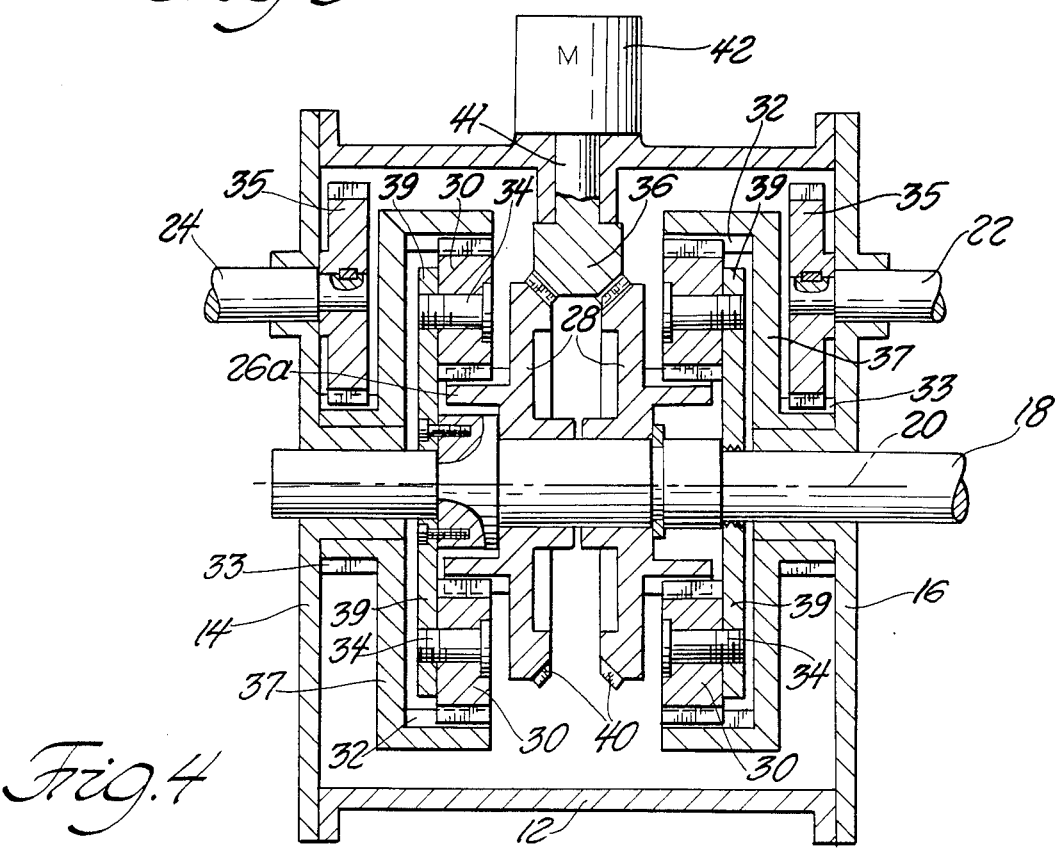

The drawings show three embodiments of my invention. In FIG. 1 I show an arrangement wherein reaction control forces are applied to planet gears in each planetary drive system. In FIG. 3 I show an arrangement wherein reaction control forces are applied to ring gears in the planetary drive systems. FIG. 4 illustrates a third form of the invention wherein reaction control forces are applied to sun gears in the planetary drive systems.

The term "reaction control force" is used herein to mean a variable force applied to a gear to hold it in a stationary position or move it in a circular orbit, whereby the gear can serve as a fixed reaction member or as a freely rotatable member, thereby varying the drive forces transmitted by the planetary drive system.

The three illustrated forms of my invention operate in essentially the same general fashion. A common general idea or concept is involved in all three illustrated constructions.

FIG. 1

FIG. 1 shows a steering mechanism for a military tank or other tracked vehicle. The mechanism includes a housing structure 10 comprised of a tubular (cylindrical) housing component 12 and two end plates 14 and 16 bolted or otherwise affixed to opposite ends of component 12. A single input shaft 18 is positioned in the housing structure for rotary motion around axis 20. A non-illustrated power source is connectable to the right end of shaft 18 for vehicle propulsion purposes.

Separate output shafts 22 and 24 extend in opposite directions from housing 10 for connection with non-illustrated track drive sprockets at opposite sides of the vehicle. In a typical vehicle installation shafts 18, 22 and 24 will be horizontal parallel shafts extending transverse to the vehicle longitudinal axis.

Input shaft 18 is connected to each output shaft 22 or 24 via a separate planetary drive system. Each planetary system comprises a sun gear 26 affixed to shaft 18, a planet carrier (disk) 28, a plural number of planet gears 30, and a ring gear 32. Planet gear carrier 28 is concentric around shaft axis 20, such that the various planet gear shafts 34 are at the same radial distance from axis 20; planet gears 30 are free to rotate around the associated planet shafts 34 under the driving force of sun gear 26.

Figure 2:
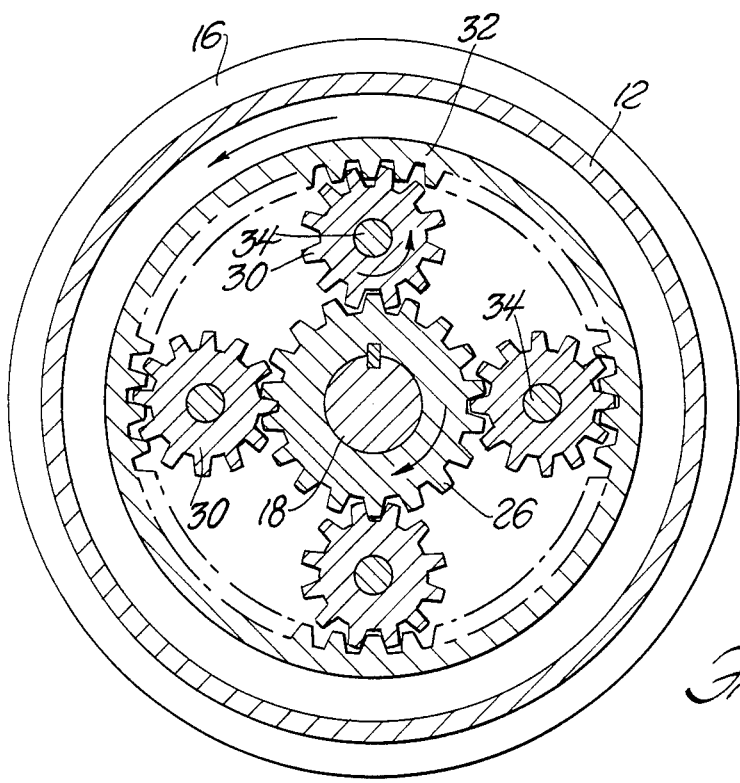
FIG. 2 is a sectional view on line 2—2 in FIG. 1.

Carrier 28 is normally held in a stationary position (by bevel gear 36), such that planet gear shafts 34 are fixed in space. If input shaft 18 is rotating in a clockwise direction (FIG. 2), ring gear 32 will rotate counterclockwise, as denoted by the arrows in FIG. 2.

Each ring gear 32 is carried on a freely rotatable plate 37. A small diameter gear 33 is carried on the inner face area of plate 37 for continuous mesh with a pinion gear 35 that is carried on the associated output shaft 22 or 24. With both planet gear carrier disks 28 held stationary, both output shafts 22 and 24 will rotate in the same direction. The vehicle will thus move straight forward or backward, depending on the direction given to input shaft 18 by the non-illustrated power plant.

Figure 5:
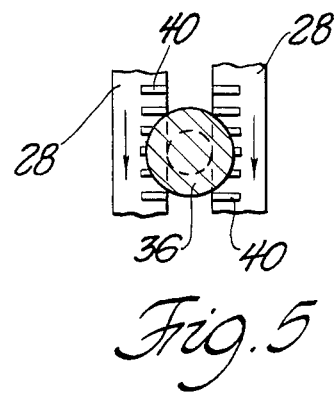
FIG. 5 is a fragmentary sectional view on line 5—5 in FIG. 1.

Each planet gear carrier 28 is freely rotatably mounted on shaft 18 such that the shaft does not apply a rotary drive force to the carrier. Normally bevel gear 36 is in mesh with bevel gear teeth 40 formed on (or affixed to) carrier 28 such that gear 36 holds each carrier 28 in a stationary position without application of a control force. For example, if load forces are acting through carriers 28, 28 in the direction denoted by the arrows in FIG. 5, the two load forces will act on bevel gear 36 in opposition to one another. Gear 36 will hold the two planet gear carriers 28 motionless without application of a control force (except during vehicle turn actions).

The two planet gear carriers 28 constitute reaction members for holding the associated planet gear shafts 34 stationary against orbital motions around central axis 20, thereby ensuring that both output shafts 22 and 24 will rotate in the same sense and at the same speed (when the vehicle is moving straight ahead or straight back).

Bevel gear 36 is affixed to a shaft 41 of a steering control motor 42 (electric or hydraulic). When motor 42 is energized gear 36 is rotated, such that reaction disks 28 move in opposite directions around central axis 20. One set of planet shafts 34 moves with the direction of motion of the associated ring gear 32 to increase the rotational speed of that ring gear; the other set of planet shafts moves in opposition to the associated ring gear 32 to decrease the rotational speed of that ring gear (and eventually reverse its direction of motion).

The action of steering control motor 42 is such that the vehicle is caused to turn to the right or to the left. Motor 42 is a reversible motor; in one operational mode of motor 42 the vehicle turns to the right, whereas in the other operational mode of motor 42 the vehicle turns to the left.

My invention is concerned primarily with the steering control system comprised of motor 42, bevel gear 36, and controlled reaction members 28. A single motor 42 is employed to simultaneously adjust the positions of members 28 (in opposite directions), to thereby control the vehicle steer action.

FIG. 3

FIG. 3 illustrates a second form of the invention wherein each reaction disk member 28 has a ring gear 32a affixed thereto. A sun gear 26 is affixed to input shaft 18 for meshed engagement with planet gears 30. Planet shafts 34 are affixed to a radial plate (carrier) 37.

During straight line motion of the vehicle both reaction members 28 are held stationary. Rotation of input shaft 18 causes sun gear 26 to rotate planet gears 30 around planet shafts 34. Gears 30 react against stationary ring gear teeth 32a, thereby producing an orbital motion of each plate 37 around axis 20. Gear 33 on plate 37 acts on the associated output gear 35 to rotate the associated output shaft. When motor 42 is energized the two reaction disk members 28 are rotated in opposite directions to produce a vehicle steering action, in the previously described fashion.

FIG. 4

FIG. 4 illustrates another form of the invention wherein each reaction disk member 28 has a sun gear 26a affixed thereto. Input shaft 18 has a plate-like planet gear carrier 39 affixed thereto. Planet gears 30 are freely rotatable mounted on shafts 34 extending from the associated carrier 39. Each planet gear 30 is in simultaneous mesh with sun gear 26a and ring gear 32 extending from plate 37.

During straight line motion of the vehicle both reaction members 28 are held stationary by bevel gear 36. Rotation of shaft 18 causes carrier 39 to rotate around central axis 20. Planet gears 30 react against the stationary teeth on sun gear 26a to exert drive forces on ring gear 32. Associated gear 33 transmits the drive force to output gear 35.

A steer action is achieved by energizing steering control motor 42. Reaction members 28 rotate in opposite direction to increase the speed of one ring gear 32 and decrease the speed of the other ring gear (and eventually reverse its direction to effect a pivot turn).

In each of the illustrated arrangements (FIGS. 1, 3 and 4) the steering mechanism comprises a single input shaft 18, a first output shaft 22 connectable with a sprocket at one side of the vehicle, a second output shaft 24 connectable with a sprocket at the other side of the vehicle, a first planetary gear means arranged between the input shaft and the first output shaft, and a second planetary gear means arranged between the input shaft and the second output shaft. Each planetary gear means comprises a sun gear, ring gear and planet gear. A first reaction means 28 is concentric with the input shaft for normally holding one of the gears in the first planetary gear means stationary. A second reaction means 28 is concentric with the input shaft for normally holding one of the gears in the second planetary gear means stationary. A steering control motor means 42,36 is located to rotate the first and second reaction means in opposite directions around the input shaft axis, to thereby vary the relative speeds of the output shafts.

In one instance (FIG. 1) each reaction means 28 exerts a reaction force on the planet gears 30. In another instance (FIG. 3) each reaction means 28 exerts a reaction force on a ring gear. In a third instance (FIG. 4) each reaction member 28 exerts its force on a sun gear. The various embodiments of the invention are relatively inexpensive compact constructions adapted for use in tracked military vehicles.

FEATURES OF THE INVENTION

The structures shown in FIGS. 1, 3 and 4 are broadly similar to structures shown in aforementioned U.S. Pat. No. 3,351,149 to Lundin et al. In that patented arrangement an input shaft 9 has geared connections 10,13 and 11,12 with non-illustrated sprocket drive shafts. The Lundin et al steering control mechanism comprises a control motor 26, shaft 25, bevel gear means 24, and elongated control shafts 22 and 23.

My proposed system is a simplification of the Lundin et al arrangement in that Lundins auxiliary shafts 22 and 23 are not required. In my proposed arrangement the steering control reaction members 28,28 are centered on the input shaft; no auxiliary shafts are necessary. Additionally, in my proposed mechanism the steer control gear 36 is compactly arranged in direct engagement with both planetary drive systems. The overall size of the drive system can be somewhat reduced, compared with that obtainable with the Lundin et al arrangement.

The drawings show two arrangements wherein the input power is applied to a sun gear (FIGS. 1 and 3) and a third arrangement wherein the input power is applied to a planet carrier (FIG. 4). Other arrangements are possible. For example, an arrangement can be visualized wherein the drive input is applied to ring gears and the steering inputs are applied to sun gears.

I wish it to be understood that I do not desire to be limited to the exact details of construction shown and described for obvious modifications will occur to a person skilled in the art, without departing from the spirit and scope of the appended claims.

I claim:

1. A steering mechanism for a tracked vehicle, comprising:

a gear box hving two opposed walls;

a shaft means for mounting gears within the gear box, the shaft means including an inwardly projected sleeve mounted inside the gear box on each of the opposed walls and a power input shaft passing through the sleeves;

first and second planetary gear sets in the gear box rotatable about the input shaft, a first rotatable member from each set concentrically mounted on the input shaft in the central zone of the gear box, the first rotatable members being in adjacency with one another;

output shafts parallel to the input shaft passing through the opposed walls, a first output shaft rotatably connected to the input shaft by first output gear mounted on the first output shaft and the first planetary gear set, a second output shaft connected to the input shaft by a second output gear mounted on the second output shaft and the second planetary gear set;

each planetary gear set having a drive gear concentrically mounted on one of the sleeves of the gear box for driving one of the output gears;

a steering motor mounted on the gear box;

a steering motor gear driven by the steering motor for engaging first rotatable member in each planetary gear set so as to control the relative rotational speeds between two selected elements of each planetary gear set.

2. The device of claim 1 wherein the gear box defines spaces between the steering motor gear and the sides of the gear box, and wherein peripheral zones of the drive gears extending radially into the spaces and substantial portions of the output gears radially extend into the spaces.

3. The device of claim 2 wherein approximately one-half of the output gears extent into the spaces.

4. The device of claim 3 wherein the output gears are in closely spaced parallel relation to the drive gears.

5. The device of claim 4 wherein the output gears are closely spaced parallel relation to the sides of the gear box.

6. The device of 5 wherein the input shaft defines shoulders for abutting the sleeves to prevent axial translation of the input relative to the output shafts.

7. The device of claim 6 wherein each of the planetary gear sets has a sun gear, a plurality of planet gears mounted on a planet gear carrier so as to be orbitally engaged to the sun gear, and the ring gear surrounding the planet gears, one of the gears of each planetary gear set being the drive gear and another gear of each set being the first rotatable member.

8. A steering mechanism for a tracked vehicle, comprising:

a gear box enclosing a space generally rectangular in cross section and having two opposed parallel sides, each side integrally defining a cylindrical inner sleeve projected into the gear box and integrally defining a cylindrical outer sleeve projecting outwardly from the gear box, the axes of the inner and outer sleeves all being parallel to one another, the gear box also integrally defining a journalling sleeve extending into the cross-sectionally rectangular space perpendicularly to the axes of the inner and outer sleeves;

rotating members within the gear box;

a drive shaft journalled in the inner cylinders and extended perpendicularly through the sides of the gear box, the drive shaft having first shoulders for holding at least one rotating member in the gear box in a fixed axial position on the drive shaft;

an output shaft parallel to the drive shaft journalled in either outer sleeve;

an output gear on each output shaft in bearingly abutting contact with the inner surface of a respective side of the gear box;

two planetary gear sets concentrically surrounding the drive shaft for connecting the drive shaft to the output gears, the planetary gear sets being comprised of the rotating members;

a steering motor mounted directly to the exterior of the gear box;

a steering motor shaft extending from the motor coaxially within the journalling sleeve so as to be perpendicular to the drive shaft;

a steering motor gear on the opposite end of the steering motor shaft from the steering motor, the steering motor gear being disposed between the planetary gear sets;

a first rotating member from each planetary gear set disposed at the central zone of the drive shaft to mesh with the steering motor gear, each first rotating member having a ring-like peripheral wall extending toward the other first rotating member such that the ring-like walls are in abutting contact with one another;

a second rotating member from each planetary gear set for driving the output gears, the second rotating member being parallel to and spaced from the output gear so as to form a thin planar gap therewith, the second rotating member having an annular peripheral wall whose inside surface mounts on the respective inner sleeve of the gear box so that the second rotating member is concentric with the drive shaft, the outer surface of the peripheral wall having teeth to mate with the outer edge of respective output gear;

one face of the output gear being oriented toward the steering motor gear and an outer peripheral zone of the output gear being disposed between the journalling sleeve and one side of the gear box;

a third rotating member from each planetary gear set fixed to the drive shaft for transferring rotational motion of the drive shaft to the planetary gear set.

9. The device of claim 8 wherein second shoulders on the drive shaft engage ends of the inner sleeves to prevent axial translation of the drive shaft relative to the gear box.

10. The device of claim 9 wherein the drive shaft defines first shoulders thereon for preventing axial translation of the first rotating members.

* * * * *